United States Patent
Askan

(10) Patent No.: US 10,978,259 B2
(45) Date of Patent: Apr. 13, 2021

(54) CIRCUIT BREAKER

(71) Applicant: Eaton Intelligent Power Limited, Dublin (IE)

(72) Inventor: Kenan Askan, Vienna (AT)

(73) Assignee: EATON INTELLIGENT POWER LIMITED, Dublin (IE)

( * ) Notice: Subject to any disclaimer, the term of this patent is extended or adjusted under 35 U.S.C. 154(b) by 97 days.

(21) Appl. No.: 16/542,354

(22) Filed: Aug. 16, 2019

(65) Prior Publication Data

US 2020/0185163 A1 Jun. 11, 2020

(30) Foreign Application Priority Data

Dec. 7, 2018 (GB) .................................... 1820013

(51) Int. Cl.
*H01H 9/54* (2006.01)
*H02H 3/02* (2006.01)
*H02H 3/08* (2006.01)

(52) U.S. Cl.
CPC ............ *H01H 9/548* (2013.01); *H02H 3/021* (2013.01); *H02H 3/08* (2013.01); *H01H 2009/543* (2013.01); *H01H 2009/544* (2013.01)

(58) Field of Classification Search
CPC .............................. H01H 1/60; H01H 9/54–56
See application file for complete search history.

(56) References Cited

U.S. PATENT DOCUMENTS

| | | | |
|---|---|---|---|
| 2014/0091059 A1 | 4/2014 | Henke | |
| 2016/0131712 A1* | 5/2016 | Bock | H01H 47/02 324/537 |

FOREIGN PATENT DOCUMENTS

| | | |
|---|---|---|
| SU | 1756970 A1 | 8/1992 |
| WO | WO 2015028634 A1 | 3/2015 |

OTHER PUBLICATIONS

Google translation of "Method for cleaning electrical contacts of a circuit breaker, Patent No. 1756970". Found at <https://patents.su/5-1756970-sposob-ochistki-ehlektricheskikh-kontaktov-avtomaticheskogo-vyklyuchatelya.html>. Accessed Jan. 1, 2021. (Year: 2021).*

* cited by examiner

*Primary Examiner* — Jared Fureman
*Assistant Examiner* — Christopher J Clark
(74) *Attorney, Agent, or Firm* — Leydig, Voit & Mayer, Ltd.

(57) ABSTRACT

A circuit breaker includes: a live line between a live supply connecting terminal and a live load connecting terminal; a neutral line between a neutral supply connecting terminal and a neutral load connecting terminal; a processing unit; a mechanical switch located in the live line, which mechanical switch is controllable by the processing unit; a trigger for interrupting the live line and/or the neutral line; and an auxiliary line connecting the neutral line with the live line between the mechanical switch and the live load connecting terminal, the auxiliary line including serially a current limiting resistor and a control switch controllable by the processing unit. The processing unit controls the control switch and to open and close at least the mechanical switch for a removal of oxidation layers of mechanical contacts of at least the mechanical switch by controlled arcing.

11 Claims, 1 Drawing Sheet

CIRCUIT BREAKER

CROSS-REFERENCE TO PRIOR APPLICATION

Priority is claimed to British Patent Application No. GB 1820013.9, filed on Dec. 7, 2018, the entire disclosure of which is hereby incorporated by reference herein.

FIELD

The present invention relates to a circuit breaker.

BACKGROUND

Circuit breakers usually comprise a mechanical switch to interrupt an electrical circuit. A possible problem is that the mechanical contacts of an opened mechanical switch will be covered by oxidation layers over the time. Such oxidation layers can cause problems by increasing the contact resistance of the mechanical switch. This can cause a loss of signal or overheating of the contacts. Usually those oxidation layers are frequently removed by simply switching on the circuit breaker. In this case usually an arcing between the mechanical contacts of the mechanical switch occurs, which will remove the oxidation layers.

However, if the circuit breaker is switched on while no load is connected, or the current is too small to cause sufficient arcing, the removal of the oxidation layers will not happen.

A disadvantage of the known circuit breakers is, therefore, that under certain circumstances oxidation layers on the mechanical contacts are not removed. The use of high quality gold or silver plated contacts could prevent this problem, but these high quality contacts would make the circuit breakers very expensive.

SUMMARY

In an embodiment, the present invention provides a circuit breaker, comprising: a live line between a live supply connecting terminal and a live load connecting terminal; a neutral line between a neutral supply connecting terminal and a neutral load connecting terminal; a processing unit; a mechanical switch located in the live line, which mechanical switch is controllable by the processing unit; a trigger configured to interrupt the live line and/or the neutral line; and an auxiliary line connecting the neutral line with the live line between the mechanical switch and the live load connecting terminal, the auxiliary line comprising serially a current limiting resistor and a control switch controllable by the processing unit, wherein the processing unit is configured to control the control switch and to open and close at least the mechanical switch for a removal of oxidation layers of mechanical contacts of at least the mechanical switch by controlled arcing.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a circuit breaker mentioned above, which avoids the mentioned disadvantages, which can be safely operated, is not expensive and has a high lifetime.

The advantage thus results that the oxidation layers at least on the mechanical contacts of the mechanical switch will be reliably removed, since at least the current flowing through the current limiting resistor will cause enough arcing to remove the oxidation layers when closing the mechanical switch. With the control switch it can be controlled that this limited current for causing the arcing is just provided when needed, limiting the waste of electric energy. Since the oxidations are reliably removed from the mechanical contacts, a dangerous overheating of the contacts can be prevented. Further the lifetime of the circuit breaker will be extended.

In an embodiment, the present invention provides a method for operating, which avoids the mentioned disadvantages, which will enable a safe operation of the circuit breaker.

The advantages of the method correspond to the advantages of the circuit breaker mentioned above.

Figure 1:
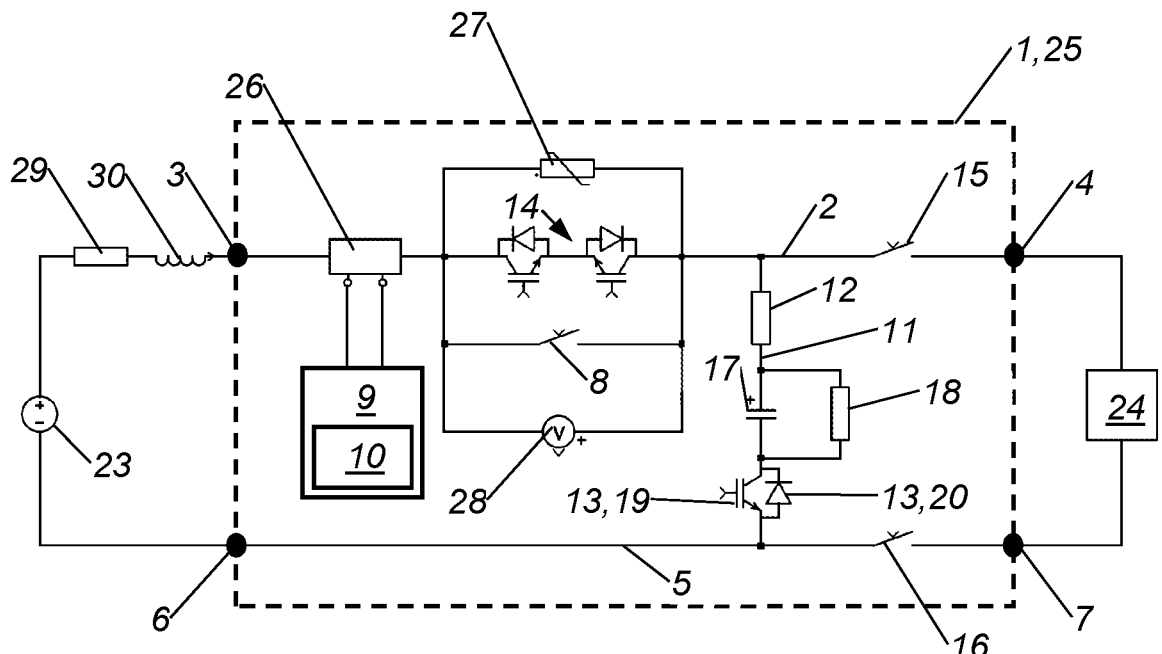
FIG. 1 shows a first preferred embodiment of the circuit breaker as a schematic.
Figure 2:
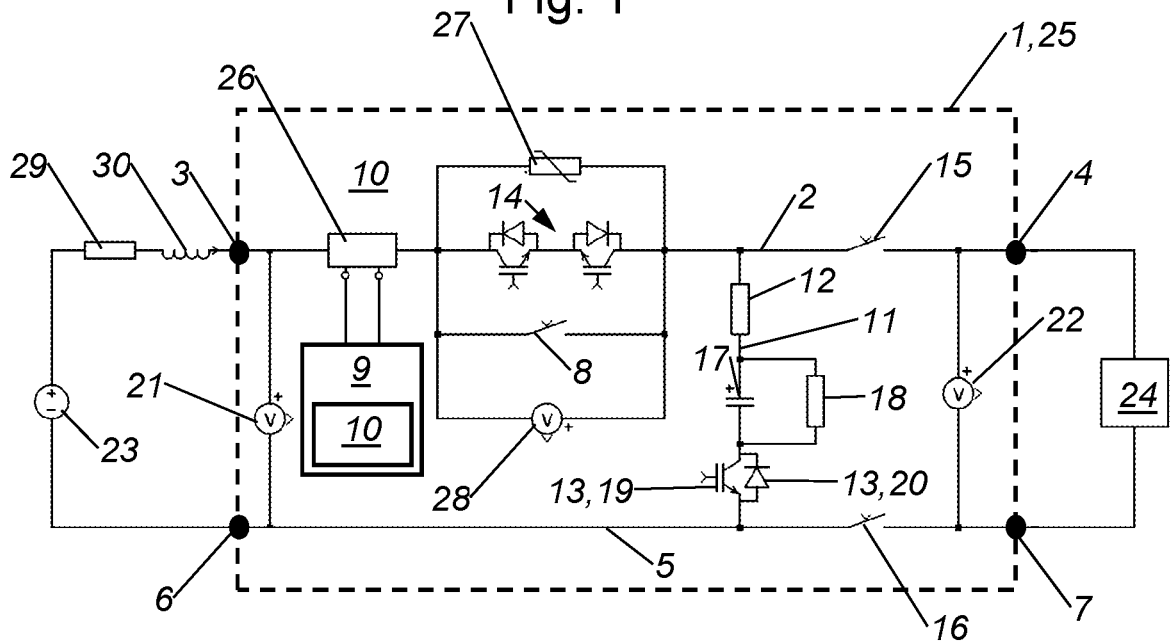
FIG. 2 shows a second preferred embodiment of the circuit breaker as a schematic.

FIGS. 1 and 2 show preferred embodiments of a circuit breaker 1 comprising a live line 2 between a live supply connecting terminal 3 and a live load connecting terminal 4, a neutral line 5 between a neutral supply connecting terminal 6 and a neutral load connecting terminal 7, and a mechanical switch 8 being located in the live line 2, which mechanical switch 8 is controlled by a processing unit 9 of the circuit breaker 1, comprising further a trigger 10 for interrupting at the live line 2 and/or the neutral line 5.

A circuit breaker 1 is an automatically operated electrical switch being adapted to disrupt an electrical circuit in the case of defined hazardous situation. The circuit breaker 1 is designed to connect a power supply 23 with a load 24, wherein the load can be another power distributing network with several loads 24. The power supply can comprise an internal resistance 29 and an internal inductance 30. For connecting to the power supply 23 the circuit breaker 1 comprises live supply connecting terminal 3 and a neutral supply connecting terminal 6. For connecting to the load 24 the circuit breaker 1 comprises a live load connecting terminal 4 and a neutral load connecting terminal 7. The terminals 3,4,6,7 are connected with a live line 2 and a neutral line 5, which are located in a casing 25 of the circuit breaker 1.

The circuit breaker 1 comprises a trigger 10, which is adapted to detect a defined hazardous situation, and to cause to interrupt the live line 2 and/or the neutral line 5 in the case of detection. This hazardous situation can, as an example, be an overcurrent, a short circuit and/or an exceeding residual current. The preferred embodiments in the FIGS. 1 and 2 show a overcurrent protection device, where the current is monitored via a shunt resistance 26, with the shunt resistance 26 being connected to the processing unit 9.

The circuit breaker 1 further comprises a mechanical switch 8 which is controlled by the processing unit 9 of the circuit breaker 1. The mechanical switch 8 can, in particular, be part of an arrangement to interrupt the live line 2 and/or the neutral line 5.

It is further provided that an auxiliary line 11 is connecting the neutral line 5 with the live line 2 between the mechanical switch 8 and the live load connecting terminal 4, with the auxiliary line 11 comprising serially a current limiting resistor 12 and a control switch 13 being controlled by the processing unit 9, with the processing unit 9 being adapted to control the control switch 13 and to open and close at least the mechanical switch 8 for a removal of oxidation layers of mechanical contacts of at least the mechanical switch 8 by controlled arcing. The function of the auxiliary line 11 line is to provide a current, which current is controlled by the control switch 13 and limited by the current limiting resistor 12, for the mechanical switch 8. This current is sufficiently high enough to cause sufficient arcing when closing the mechanical switch 8 for removal of the oxidation layers.

The advantage thus results that the oxidation layers at least on the mechanical contacts of the mechanical 8 switch will be reliably removed, since at least the current flowing through the current limiting resistor 12 will cause enough arcing to remove the oxidation layers when closing the mechanical switch 8. With the control switch 13 it can be controlled that this limited current for causing the arcing is just provided when needed, limiting the waste of electric energy. Since the oxidations are reliably removed from the mechanical contacts, a dangerous overheating of the contacts can be prevented. Further the lifetime of the circuit breaker 1 will be extended.

Further a method for operating the circuit breaker is provided, wherein in a turned off state of the circuit breaker 1 an oxidation layer removal step is executed, wherein the oxidation layer removal step comprises following steps:
  closing of the control switch 13,
  closing and opening of the mechanical switch 8 at least one time to cause controlled arcing in the mechanical switch 8 to remove oxidation layers on its mechanical contacts,
  opening of the control switch 13.

In particular, it can be provided that the oxidation layer removal step is carried out after the processing unit 9 receives a signal to turn on the circuit breaker 1, but before the circuit breaker 1 is turned on. Hereby, the oxidation layer removal step is executed immediately before turning on the circuit breaker 1.

During closing of the mechanical switch 8 bouncing can occur, which will aid the removal of the oxidation layers.

It can be provided that the mechanical switch 8 is closed and opened just once during the oxidation layer removal step.

Further it can be provided that the mechanical switch 8 is closed and opened several times during the oxidation layer removal step.

Particularly it can be provided that the resistance of the current limiting resistor 12 is designed to limit the current below 100 mA for the supply voltage of the circuit breaker 1.

Further it can be provided that a semiconductor switching unit 14 being controlled by the processing unit 9 is connected parallel to mechanical switch 8. Circuit breakers 1 having a semiconductor switching unit 14 parallel to a mechanical switch 8 are often called hybrid circuit breakers. The function of a hybrid circuit breaker is described in detail in the WO 2015/028634 A1. In normal operation the semiconductor switching unit 14 is turned on when closing and opening the mechanical switch 8, providing a bypass for the mechanical switch 8. This reduces the flowing current over the mechanical switch 8 during closing and opening the mechanical switch 8, which is very beneficial if an overcurrent has to be shut off. However, this also reduces the removal of oxidation layers on the mechanical contacts. Further the mechanical switch 8 in a hybrid circuit breaker is designed for an ultra-fast opening, thus limiting the geometry and volume of the mechanical switch 8, making it more critical for the function of the circuit breaker 1.

In the oxidation layer removal step the semiconductor switching unit 14 is switched off, when closing and/or opening of the mechanical switch 8, causing the current over the auxiliary line 11 to be available for controlled arcing of the mechanical contacts.

In the preferred embodiments in FIGS. 1 and 2 the semiconductor switching unit 14 comprises two isolated gate bipolar transistors with antiparallel diodes, with the isolated gate bipolar transistors being connected serially. Further a varistor 27 can be provided as an overvoltage protection for the semiconductor switching unit 14.

Further it can be provided that at least one galvanic separation switch 15,16 being controlled by the processing unit 9 is located in the live line 2 and/or the neutral line 5. Particularly it can be provided that a first galvanic separation switch 15 is located in the live line 2 and that a second galvanic separation switch 16 is provided in the neutral line 5. The function of the at least one galvanic separation switch 15,16 is to ensure that the circuit breaker 1 still interrupts the electrical circuit at least once under nominal current in the case of a malfunction inside the circuit breaker 1, especially of the semiconductor switching unit 14.

Hereby it can be provided that the auxiliary line 11 is connected to the live line 2 between the mechanical switch 8 and the first galvanic separation switch 15. This way the current can flow over the auxiliary line 11, when the first galvanic separation switch 15 is opened.

In particular, it can be provided that a buffer capacitor 17 is arranged in the auxiliary line 11, with the buffer capacitor 17 being connected serially to the current limiting resistor 12 and the control switch 13. The buffer capacitor 17 will be charged when the current flows through the mechanical switch 8. When the mechanical switch 8 is opened, therefore separating the rest of the circuit from the supply, the buffer capacitor 17 will stay charged until the galvanic separation switches 15,16 are closed. When closing the galvanic separation switches 15,16 the charge stored in the buffer capacitor 17 will unload over the load 24, causing arcing between the mechanical contacts of the galvanic separation switches 15,16, thus removing their oxide layers.

In particular, the oxidation layer removal step can comprise the further steps:
  charging the buffer capacitor 17 by closing the control switch 13 and the mechanical switch 8,
  opening at least the mechanical switch 8 and uncharging the buffer capacitor 17 via the at least one galvanic separation switch 15,16 to remove oxidation layers on its mechanical contacts.

Further it can be provided that a second auxiliary line, which is not shown in the Fig., is connected to the live line 2 between the first galvanic separation switch 15 and the live load connecting terminal 4 and is connected to the neutral line 5 between the second galvanic separation switch 16 and the neutral load connecting terminal 7. The second auxiliary line can comprise a further control switch, which is used for switching the second auxiliary line. With the second auxiliary line being switched on, an arcing current can flow over the galvanic separation switches 15,16 independent from the load 24.

In particular, a discharge resistor 18 is connected parallel to the buffer capacitor. This discharge resistor 18 has the function to discharge the buffer capacitor 17 after its operation. This way the energy stored in the buffer capacitor 17 is not dangerous during such as maintenance work.

Particularly it can be provided that the control switch 13 is a semiconductor switch. This enables a fast switching of the control switch 13.

Alternatively it can be provided that the control switch 13 is a mechanical switch.

Further, it can be provided that the control switch 13 comprises an isolated gate bipolar transistor 19 with an antiparallel diode 20.

Alternatively it can be provided that the control switch 13 comprises a MOSFET.

In the preferred embodiments the processing unit 9 is, in particular, adapted to function as follows. At the beginning the mechanical switch 8, the control switch 13, and the two galvanic separation switches 15,16 are in an opened state. Then the control switch 13 is closed and the mechanical switch 8 closed and opened at least once, with the current limited by the current limiting resistor 12 removes the oxidation layers of the mechanical contacts of the mechanical switch 8. The energy stored in the buffer capacitor 17 is then used to remove the oxidation layers of the mechanical contacts of the galvanic separation switches 15,16. A current limited by current limiting resistor 12 will be flowing the antiparallel diode 20, while the two galvanic separation switches 15,16 are closing and opening at least once. After all, the control switch 13 is opened and the circuit breaker 1 is ready to be switched on.

According to the second preferred embodiment as shown in FIG. 2, it can, in particular, be provided that a supply voltmeter 21 is arranged to measure the voltage between the live supply connecting terminal 3 and the neutral supply connecting terminal 6, and that a load voltmeter 22 is arranged to measure the voltage between the live load connecting terminal 4 and the neutral load connecting terminal 7. The supply voltmeter 21 and the load voltmeter 22 are, in particular, connected to the processing unit 9. By comparing the measured voltage of the supply voltmeter 21 and of the load voltmeter 22, the aging of the mechanical contacts of the circuit breaker 1 can be estimated. In particular, when the difference between the measured voltage of the supply voltmeter 21 and of the load voltmeter 22 is larger than a threshold value, the processing unit 9 can output a signal indicating aging of the contacts or insufficient contact force.

Further it can be provided that a bypass voltmeter 28 is arranged to measure the voltage drop at the mechanical switch 8. The supply bypass voltmeter 28 is, in particular, connected to the processing unit 9. When the galvanic separation switches 15,16 are opened, and the mechanical switch 8 and the control switch 13 are closed, the resistance of the mechanical switch 8 can be calculated, since the resistance of the current limiting resistor 12 is known. This way the contact resistance and therefore the aging of the mechanical switch 8 can be measured. In particular, when the resistance of the mechanical switch 8 is larger than another threshold value, the processing unit 9 can output another signal indicating aging of the mechanical switch 8 or insufficient contact force. In combination with the supply voltmeter 21 and the load voltmeter 22 the bypass voltmeter 28 can be used to determine the contact resistance of the mechanical switch 8 and the two galvanic separation switches 15,16.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A circuit breaker, comprising:
    a live line between a live supply connecting terminal and a live load connecting terminal;
    a neutral line between a neutral supply connecting terminal and a neutral load connecting terminal;
    a processing unit;
    a mechanical switch located in the live line, which mechanical switch is controllable by the processing unit;
    a trigger configured to interrupt the live line and/or the neutral line; and
    an auxiliary line connecting the neutral line with the live line between the mechanical switch and the live load connecting terminal, the auxiliary line comprising serially a current limiting resistor and a control switch controllable by the processing unit,
    wherein the processing unit is configured to control the control switch and to open and close at least the mechanical switch for a removal of oxidation layers of mechanical contacts of at least the mechanical switch by controlled arcing.

2. The circuit breaker according to claim 1, further comprising a semiconductor switching unit controllable by the processing unit, the semiconductor switching unit being connected parallel to the mechanical switch.

3. The circuit breaker according to claim 1, further comprising at least one galvanic separation switch controllable by the processing unit, the at least one galvanic separation switch being located in the live line and/or the neutral line.

4. The circuit breaker according to claim 1, further comprising a buffer capacitor arranged in the auxiliary line, the buffer capacitor being connected serially to the current limiting resistor and the control switch.

5. The circuit breaker according to claim 4, further comprising a discharge resistor connected parallel to the buffer capacitor.

6. The circuit breaker according to claim 1, wherein the control switch comprises a semiconductor switch.

7. The circuit breaker according to claim 1, wherein the control switch comprises an isolated gate bipolar transistor with an antiparallel diode.

8. The circuit breaker according to claim 1, further comprising:
a supply voltmeter configured to measure a voltage between the live supply connecting terminal and the neutral supply connecting terminal; and
a load voltmeter configured to measure a voltage between the live load connecting terminal and the neutral load connecting terminal.

9. The circuit breaker according to claim 1, further comprising a bypass voltmeter configured to measure a voltage drop at the mechanical switch.

10. A method for operating the circuit breaker according to claim 1, wherein, in a turned off state of the circuit breaker an oxidation layer removal step is executed, the oxidation layer removal step comprising the following steps:

closing the control switch;
closing and opening the mechanical switch at least one time to cause controlled arcing in the mechanical switch to remove oxidation layers on its mechanical contacts; and
opening the control switch.

11. The method according to claim 10,
wherein a buffer capacitor is arranged in the auxiliary line, the buffer capacitor being connected serially to the current limiting resistor and the control switch; and
wherein at least one galvanic separation switch controllable by the processing unit is located in the live line and/or the neutral line, the oxidation layer removal step further comprising the following steps:
charging the buffer capacitor by closing the control switch and the mechanical switch; and
opening at least the mechanical switch and uncharging the buffer capacitor via the at least one galvanic separation switch to remove oxidation layers on its mechanical contacts.

* * * * *